(Model.)

C. C. KLEIN.
SHAFT COUPLING.

No. 253,872.  Patented Feb. 21, 1882.

George M. Bradford
Otto Reeser
Witnesses.

Chas. C. Klein
Inventor.

UNITED STATES PATENT OFFICE.

CHARLES C. KLEIN, OF PHILADELPHIA, PENNSYLVANIA.

SHAFT-COUPLING.

SPECIFICATION forming part of Letters Patent No. 253,872, dated February 21, 1882.

Application filed January 3, 1881. (Model.)

*To all whom it may concern:*

Be it known that I, CHARLES C. KLEIN, of Philadelphia, county of Philadelphia, and State of Pennsylvania, have invented certain new and useful Improvements in Shaft-Couplings, which improvements are fully set forth in the following specification, reference being had to the accompanying drawings, in which—

Figure 1:
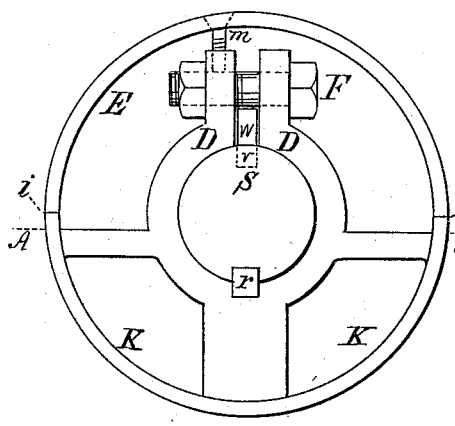
Figure 2:
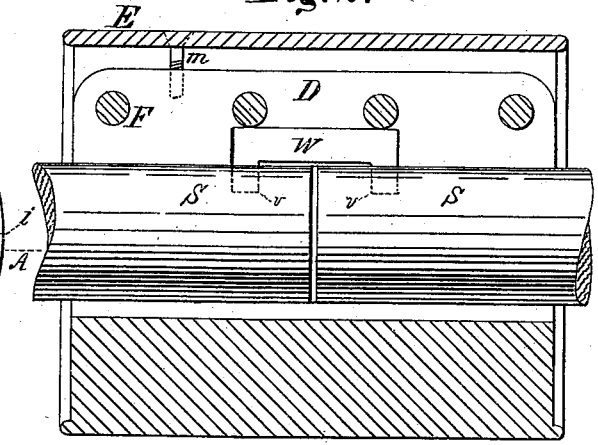
Figure 3:
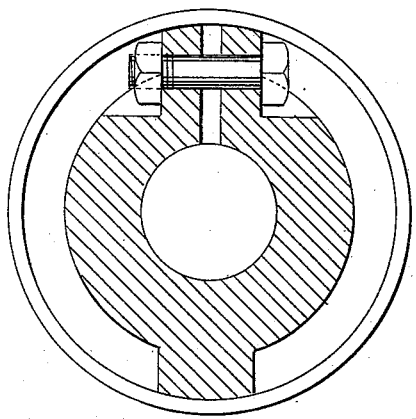
Figure 4:
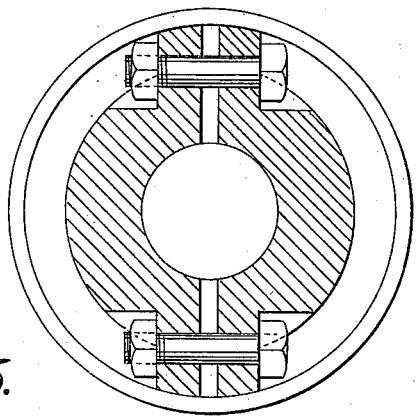

Figure 1 is an end view; Fig. 2, a vertical longitudinal section; Figs. 3 and 4, examples of couplings as heretofore constructed, and to which the improvements relate; and Fig. 5, an enlarged view of the differential clamping device.

My invention relates to that class of couplings in which the clamping of the coupling to the shaft is effected by tangential screws or bolts.

The objects of my invention are, first, such a construction as will secure thorough efficiency, while at the same time it will permit the employment of common commercial bolts for clamping the coupling; second, the attainment of the greatest facility for loosening or tightening the bolts without requiring special wrenches therefor; third, such a construction as will give the coupling a neat appearance, and leave its exterior entirely free from projecting parts, for the purpose of safety while running, at the least amount of fitting; fourth, the attainment of great clamping-power in special cases by means of differential screws.

The first and second objects of my invention are accomplished by constructing that part of the coupling which sustains the torsional strain in such a manner as to secure the greatest possible rigidity, and by removing from that part which accomplishes the clamping everything which interferes with the adjustment of the bolts and with their efficiency.

In order to facilitate the explanation of my invention, I have indicated in Figs. 3 and 4 the principal characteristics of that class of couplings in which tangential bolts effect the clamping. In both constructions an entire cylindrical sleeve is used to cover the bolts, and this sleeve adds nothing to the strength of the coupling, for which reason the interior parts have to be made heavy enough to take the entire strains to which the coupling is subjected, and this increases very much the relative proportion of the diameter of the coupling to that of the shaft. In order to avoid this, and to bring the bolts as closely to the shaft as possible, recesses are usually made for receiving the heads and nuts of the bolts, by which, however, another difficulty—the requirement of special wrenches for the bolts—is introduced.

If the coupling indicated in Fig. 1 is divided longitudinally by an imaginary plane, A A, that part below the plane in which the key $r$ is situated sustains the torsional strain of the coupling, and that part above the plane accomplishes the clamping of the coupling to the shaft. That part of the outer periphery or rim K of the coupling which is below the plane A A is formed with the coupling in one piece, and thus adds very materially to its strength.

The upper part of the coupling, Fig. 1, consisting of the wings D D, is made just heavy enough to clasp the shaft tightly, yet not so rigid as to consume the entire or a great part of the power of the bolts in bringing them against the shaft. Hence it will be observed that by this construction the bolts can be brought within the shortest possible distance from the shaft $s$, very little of their power is lost in bending the wings D D toward the shaft, the driving part of the coupling is made thoroughly rigid with the least possible amount of material, the bolts and nuts are easy of access with common wrenches, and the necessity of longitudinal bolts, wedges, taper-screws, or other devices for gaining power, and the most objectionable feature of these devices—their becoming rusted fast and of offering dangerous projecting points at the ends of the coupling—is done away with.

In order to attain the third object of my invention, I complete the cylindrical form of the coupling by placing a cap, E, over the wings D D and bolts F, whose diameter corresponds to that of the lower part of the coupling, and fasten it by a screw, $m$, or other suitable device. Although this cap E may be made separately and fitted to the coupling, I prefer to cast the coupling in one piece, including the cap E, to break it through at the points $i\ i$, and then to finish it on the outside after the cap has again been attached to the coupling, so that the break or seam will only be detected with difficulty. By this construction it will be seen nearly half the labor of molding is saved, as well as the fitting of the cap to the coupling, the broken surfaces between the cap and the coupling forming a perfect joint without fitting them.

Figure 5:
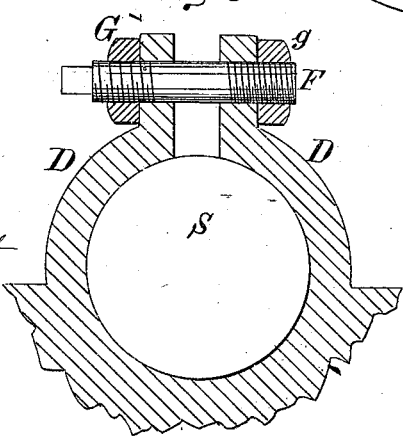

The fourth object of my invention is accomplished by the mechanical device known as the "differential screw," and is indicated by Fig. 5, in which D D are the clamping-wings of the coupling, F the bolt, and G g two nuts fitting upon screw-threads on the bolt F. The threads in the nuts are not of the same pitch; but one is coarser than the other. By screwing up the nuts separately the wings D D are drawn together in inverse proportion of the pitch; but when both the nuts are kept stationary and the bolt is revolved in the proper direction the wings approach each other with a power in inverse proportion to the difference between the pitches of the two nuts. In special cases, where an enormous clamping-power is required, this device is useful, while in ordinary cases common bolts are sufficient.

In order to prevent the shafts from being pulled out of the coupling in the direction of their length, pins are usually driven into the interior of the coupling transversely with the axis, fitting into corresponding holes in the shaft.

In order to save the time required for drilling the holes in the coupling, I form the pins v v on a link, Figs. 1 and 2. The bolts F, bearing upon the back of the link, serve to prevent the pins from drawing out of the holes in the shaft.

What I claim as my invention, and desire to secure by Letters Patent, is—

1. A shaft-coupling provided on one side of a plane dividing it longitudinally with the rim K and on the opposite side of the plane with the wings D D and tangential bolts F, substantially as and for the purpose specified.

2. In combination with a shaft-coupling having the rim K, wings D D, and tangential bolts F, the cap E and screw m, substantially as and for the purpose specified.

3. In combination with a shaft-coupling having wings D D, the bolt F and differential nuts G g, substantially as and for the purpose set forth.

CHAS. C. KLEIN.

Witnesses:
GEORGE W. BRADFORD,
OTTO REESER.